Patented July 2, 1946

2,403,148

UNITED STATES PATENT OFFICE 2,403,148

METHOD OF MAKING FLUOBORIC ACID AND ITS COMPOUNDS

Wayne E. White, Plum Township, Allegheny County, Pa., assignor to Aluminum Company of America, Pittsburgh, Pa., a corporation of Pennsylvania No Drawing. Application January 17, 1945, Serial No. 573,318

8 Claims. (Cl. 23—139)

The acid $HBF_4$, commonly called fluoboric acid, has extensive commercial use in many applications which require the use of an acid of high purity. Present methods of manufacturing high purity fluoboric acid are expensive and relatively unsatisfactory. The acid is highly corrosive and noxious, and because of its nature many difficulties are attendant upon its handling, storage and transportation.

This invention provides a new method of manufacture by which fluoboric acid may be rapidly and economically produced in large quantities. It is a further advantage of the methods of this invention that the acid may be manufactured with a minimum of equipment at the place of use. This latter advantage, coupled with the fact that the material from which the acid is made is relatively non-corrosive, reduces or removes many of the difficulties and much of the expense heretofore encountered in the handling, storage and transportation of fluoboric acid.

The method of this invention utilizes as a starting material, ammonium fluoborate $(NH_4BF_4)$. In accordance with the invention this ammonium salt is heated to cause dissociation thereof and formation of gaseous fluoboric acid, nitrogen and hydrogen. In referring herein to the production of gaseous fluoboric acid in this manner, I mean that gaseous material is produced containing hydrogen fluoride (HF) and boron trifluoride $(BF_3)$ values in the ratio required for the formation of fluoboric acid, without regard to whether such values are actually associated as fluoboric acid or as a mixture of separate gaseous compounds.

The above mentioned heating operation can be effected by first heating the ammonium fluoborate at temperatures above 250° C., preferably 275–350° C., and by then heating the vapors thus produced, without intermediate cooling, at temperatures in excess of 600° C. Within these limits the time at heat for best results is dependent upon the temperature, efficiency being promoted by the use of the higher temperatures. I prefer to operate the second heating step mentioned at about 700–900° C., having found that such temperatures promote efficiency without too much depreciation in the equipment used. The process can be successfully practiced at normal atmospheric pressures.

Instead of successive heating operations carried out as described in the preceding paragraph, the heating can be effected by introducing ammonium fluoborate directly into a zone or chamber heated to a temperature above 600° C., wherein dissociation of the fluoborate and heating of the resultant vapors at above 600° C. occurs. In either mode of operation ammonium fluoborate is heated at above 250° C., and the vapors formed by dissociation of the ammonium fluoborate are heated at temperatures in excess of 600° C.

The presence of a catalyst during heating, such as, for instance, iron or nickel, is advantageous since the efficiency of the reaction at a given temperature is thereby increased.

Following such heating operations, the gaseous fluoboric acid produced can be separated in various ways from the nitrogen and hydrogen mixed therewith. If it is desired to produce an aqueous fluoboric acid solution, the mixture of fluoboric acid, nitrogen and hydrogen, produced as described above, can be passed into water. The relatively insoluble nitrogen and hydrogen are not dissolved in the water to any appreciable extent and pass off, leaving a solution of fluoboric acid. In this manner fluoboric acid solutions can be produced in concentrations as high as 80–85 per cent of $HBF_4$ without difficulty.

Alternatively, organic solvents of the polar type, such as the alcohols, can be used instead of water to take up the fluoboric acid in a similar manner. In a further alternative, the gaseous fluoboric acid may be caused to react with a material which is relatively inert to the nitrogen and hydrogen present. For example, the mixed vapors can be led into contact with a liquid amine, such as triethanolamine or monoethanolamine, to yield thereby substituted ammonium salts, such as triethanol or monoethanol ammonium fluoborate.

The presence of traces of ammonia in the gaseous mixture produced by the heating operation at above 600° C., or in the solutions or compounds produced as mentioned above because of ammonia in the vapors, can be substantially eliminated by cooling the vapors to temperatures below about 300° C., and preferably below those at which ammonium fluoborate sublimes.

As an example of the specific operation of my invention I cite the following: A quantity of ammonium fluoborate was heated to about 300° C.; the vapors thus produced were then heated in the presence of steel wool to a temperature of 800° C. The resulting gaseous products of the reaction were then cooled to about room temperature and, thus cooled, were passed into a quantity of water. Nitrogen and hydrogen were not absorbed in the water and passed off, together with a small proportion of the fluoboric acid vapor. The operation was continued until an aqueous solution containing 74 per cent by weight of fluoboric acid was obtained. This solution contained about 75 per cent of the fluoboric acid theoretically available from the quantity of ammonium fluoborate processed.

An outstanding advantage of the processes of this invention resides in the fact that by its use fluoboric acid may be quickly and easily produced from ammonium fluoborate at the point where the acid is to be used. This results in substantial saving in transportation cost and elimination of serious difficulties now attendant upon the shipment of fluoboric acid in commerce. Fluoboric acid solutions of regular commercial grade contain about 35 to 45 per cent by weight of $HBF_4$. Thus relatively large amounts of water must be transported and stored in the shipment of the acid from one point to another. These aqueous solutions must be stored and shipped in rubber or rubber lined drums. While more concentrated solutions of fluoboric acid can be made, solutions containing more than 50 per cent by weight of fluoboric acid fume at ordinary temperatures and increase handling and shipping difficulties. The use of ammonium fluoborate and its conversion at the time and point of use into fluoboric acid by the simple and inexpensive methods of this invention are, therefore, highly advantageous. Moreover, the salt is non-corrosive and non-hygroscopic and may be stored or shipped in more ordinary types of containers. With a pure ammonium fluoborate processed in accordance with this invention, yields as high as substantially 100 per cent of the fluoboric acid in the salt can be obtained.

Having thus described my invention, I claim:

1. The process of producing fluoboric acid which comprises heating ammonium fluoborate at a temperature of at least 250° C. and heating the vapor thus formed at a temperature of at least 600° C.

2. The process of producing fluoboric acid which comprises heating ammonium fluoborate at a temperature of at least 250° C., heating the vapor thus formed at a temperature of at least 600° C., and thereafter contacting the resultant gaseous mix with a material capable of separating fluoboric acid therefrom.

3. The process of producing fluoboric acid which comprises heating ammonium fluoborate at a temperature of at least 250° C., heating the vapor thus formed at a temperature of at least 600° C., subsequently cooling the resultant gaseous mix to a temperature below 300° C., and thereafter contacting said mix with a material capable of separating fluoboric acid therefrom.

4. The process of producing fluoboric acid which comprises heating ammonium fluoborate at a temperature of at least 250° C., heating the vapor thus formed at a temperature of at least 600° C., and thereafter contacting the resultant gaseous mix with a material capable of separating fluoboric acid therefrom by absorption of fluoboric acid.

5. The process of producing a fluoboric acid compound which comprises heating ammonium fluoborate at a temperature of at least 250° C., heating the vapor thus formed at a temperature of at least 600° C., and thereafter contacting the resultant gaseous mix with a material capable of separating fluoboric acid therefrom by reaction with the fluoboric acid.

6. The process of producing a fluoboric acid compound which comprises heating ammonium fluoborate at a temperature of at least 250° C., heating the vapor thus formed at a temperature of at least 600° C., and thereafter contacting the resultant gaseous mix with an amine capable of separating fluoboric acid therefrom by reaction with the fluoboric acid.

7. The process of producing fluoboric acid which comprises heating ammonium fluoborate at temperatures of 250°–350° C. and heating the vapor thus formed at a temperature of at least 600° C.

8. The process of producing fluoboric acid which comprises heating ammonium fluoborate at temperatures of 250–350° C., heating the vapor thus formed at a temperature of at least 600° C., and thereafter contacting the resultant gaseous mix with a material capable of separating fluoboric acid therefrom.

WAYNE E. WHITE.